Patented July 14, 1931

1,814,994

UNITED STATES PATENT OFFICE

CLARENCE P. WILSON, OF POMONA, AND EARL D. STEWART, OF CORONA, CALIFORNIA, ASSIGNORS TO CALIFORNIA FRUIT GROWERS EXCHANGE, OF LOS ANGELES, CALIFORNIA, A CORPORATION OF CALIFORNIA

FOOD PRODUCT AND PROCESS OF MAKING THE SAME

No Drawing.   Application filed January 15, 1927.  Serial No. 161,461.

Our said invention relates to a new food product and a method of producing the same, and it is an object thereof to produce a dry powder or the like containing fruit juice solids in a form suitable for human consumption.

It is thoroughly established that milk is one of the best foods for human beings. It is also thoroughly established that fruit juices and especially citrus fruit juices are a very valuable addition to the diet because of the natural fruit sugars, acids, mineral salts, vitamines, etc. which they contain.

There has been a prejudice against mixing acid fruit juices, such as lemon or orange juice, with milk because the casein of the milk is precipitated or in ordinary parlance, the milk curdles.

It has been repeatedly shown however that if milk and fruit juice are mixed quickly, as for instance, a pint of milk and a pint of orange juice and thoroughly shaken the curd is so fine that it is hardly noticeable and a delightful beverage is produced.

We have discovered that fruit juice can be mixed in any desired proportion with milk, either skim milk or whole milk and the resulting mixture can be dried to produce a mixture of the dry solids of milk and fruit juice which is readily soluble in water to make a very pleasant and healthful beverage and is a dry practically non-hygroscopic product. By the expression "practically non-hygroscopic" we mean the product in powder or flake form can be handled under ordinary atmospheric conditions without serious difficulty from the product becoming lumpy or gummy.

The principles of the invention is applicable to any fruit juice and any kind of milk provided both of them are wholesome food products in themselves.

We regard as an important feature of our application the discovery that liquid milk, including skim milk and other equivalents, can serve as a drying aid or promoter whereby a non-hygroscopic product may be made from vegetable extracts such as fruit juices and other suitable juices whose dry residue ordinarily is so hygroscopic as to be incapable of collection and preservation in dry form or at least is characterized by very speedy reversion to a pasty or even a liquid form.

It is also of importance that the product be homogeneous (or at least homogeneous to a much higher extent than would result from any other process) by reason of the intimate mixture resulting from the thorough mingling of the ingredients in liquid form. In other words, the dried mixture of fruit juice and milk is homogeneous while a mixture of fruit juice and milk dried separately and then mixed is not homogeneous.

As a specific example of the product and the method of producing it, we may place in a suitable mixing kettle provided with a good stirring device 100 kilos of skim milk and 100 kilos of lemon juice. A typical lemon juice may contain 9.6% lemon solids and a typical skim milk may contain 9% total solids. We will therefore have a total of 9.6 kilos of lemon juice solids and 9 kilos of milk solids or 18.6 kilos total solid matter.

The juice and milk are immediately and thoroughly mixed and are preferably put through a homogenizer and then dried by any suitable means. We prefer to use a spray drier because the time of drying is very short and the product is not exposed to injurious temperatures for more than a very few minutes and the resulting product is in the form of a fine dry, relatively non-hygroscopic powder.

In the claims it is understood that the term milk refers to either whole milk or skim milk from an animal whose milk is fit for human consumption.

While we have described a particular mixture and method of making the same it is to be understood that equivalent materials, steps, etc., are within the spirit of our invention, as will be obvious to those skilled in the art to which it relates, and therefore we do not limit ourselves to such features except as indicated in the appended claims.

Having fully described our said invention, what we claim and desire to secure by Letters Patent is:

1. A process of producing a new food product which comprises the steps of mixing as major ingredients citrus fruit juice and milk, agitating the mixture so as to insure the formation of a very fine curd, and then drying the homogeneous mixture to produce a dry relatively non-hygroscopic product, substantially as set forth.

2. A new food product consisting in a finely divided spray-dried powder made from a homogeneous mixture of milk and fruit juice the individual grains of powder containing solids of both milk and fruit juice, whereby upon solution of the powder the solids are dispersed throughout the solution as a very fine curd.

3. A new food product in finely divided dry form consisting essentially of the solids of citrus fruit juice and milk, said product being made from a homogeneous mixture of milk and fruit juice the individual particles containing solids of both milk and fruit juice, whereby upon solution of the product the undissolved solids are dispersed throughout the solution as a very fine curd.

In testimony whereof we affix our signatures.

CLARENCE P. WILSON.
EARL D. STEWART.